United States Patent [19]

Cain et al.

[11] Patent Number: 5,062,685
[45] Date of Patent: Nov. 5, 1991

[54] COATED OPTICAL FIBERS AND CABLES AND METHOD

[75] Inventors: Michael B. Cain; Robert B. Desorcie, both of Corning; Rengan Kannabiran, Big Flats; Gitimoy Kar, Painted Post; Eric H. Urruti, Corning, all of N.Y.

[73] Assignee: Corning Incorporated, Corning, N.Y.

[21] Appl. No.: 419,674

[22] Filed: Oct. 11, 1989

[51] Int. Cl.$^5$ .............................................. G02B 6/44
[52] U.S. Cl. ............................... 350/96.23; 350/96.33
[58] Field of Search ............... 350/96.23, 96.24, 96.32, 350/96.33

[56] References Cited

U.S. PATENT DOCUMENTS

| | | | |
|---|---|---|---|
| 4,531,959 | 7/1985 | Kar et al. | 65/3.11 |
| 4,690,501 | 9/1987 | Zimmerman et al. | 350/96.33 X |
| 4,740,053 | 4/1988 | Cassidy | 350/96.23 |
| 4,796,970 | 1/1989 | Reeve et al. | 350/96.23 |
| 4,848,869 | 7/1989 | Urruti | 350/96.33 |
| 4,859,023 | 8/1989 | Eichenbaum et al. | 350/96.23 |
| 4,919,513 | 4/1990 | Nakakuki et al. | 350/96.33 |
| 4,962,992 | 10/1990 | Chapin et al. | 350/96.23 |

FOREIGN PATENT DOCUMENTS 2206220 12/1988 United Kingdom .
2206420 1/1989 United Kingdom .

OTHER PUBLICATIONS

Benning, *Plastic Foams*, vol. 1, pp. 345–408, Wiley-Interscience, New York, 1969.
Calvin J. Benning, *Plastic Foams: The Physics and Chemistry of Product Performance and Process Technology*, vol. 1, Ch. 4, "Principles of Foam Formation: Polyvinyl Chloride Foams", pp. 345–408, Wiley-Interscience, New York (1969).

*Primary Examiner*—John D. Lee
*Assistant Examiner*—Stephen W. Barns
*Attorney, Agent, or Firm*—Kees van der Sterre

[57] ABSTRACT

Optical communication media particularly adapted for blow-in installation, including single optical fibers and lightweight flexible optical cables comprising one or more glass optical fibers in a multilayer polymer coating, are disclosed. The multilayer coating includes a textured polymer outer layer and at least one soft buffer layer positioned between the textured polymer outer layer and the glass optical fiber or fibers, the buffer layer comprising a low $T_g$ polymer and preferably having a layer thickness at least sufficient to maintain thermally induced microbending loss in the optical communication medium below about 0.5 db/km at medium operating temperatures in the range of 0° C. to −60° C.

15 Claims, 2 Drawing Sheets

COATED OPTICAL FIBERS AND CABLES AND METHOD

BACKGROUND OF THE INVENTION

The present invention relates to coated optical fibers and cables, and more particularly to coated optical fibers and cables of novel coating design which are particularly well suited for blown optical fiber applications.

The terms "blow," "blown" and "blowable" as currently used in optical fiber design and optical telecommunications technology refer to optical fibers and optical fiber cables which may be installed in existing ductwork by the effect of viscous fluid drag. The fibers or cables are sufficiently small and/or light, and the ducts sufficiently close in size to the fibers or cables, that significant forces tending to draw the fibers or cables through the ducts can be generated by forcing a gas such as air through the ducts and past the fibers or cables in the direction in which they are to be drawn.

U.S. Pat. No. 4,796,970 describes optical fiber transmission media utilizing blown fibers and methods for using the same. As pointed out in that patent, optical fiber cables comprising glass optical fibers have generally been installed by methods similar to those for metal cable installation, i.e., by pulling them through the ducts with pulling cables.

However, unlike conventional wire cables, optical cables contain very thin glass fibers which are easily damaged by tensile stress. To protect these fibers, optical cables have traditionally included bulky metal or other strength members which serve no purpose other than to impart tensile strength sufficient for cable installation.

Due to the difficulty of installing optical fiber cables in existing ductwork, it is often the case that more fibers or cables than actually needed are installed. This is obviously uneconomical, and it carries the further risk that the extra installed fiber capacity will become obsolete due to advancing fiber technology before the installation investment is recovered.

In the blow-in method of optical fiber installation described in the aforementioned patent, the fibers are propelled through small conduits in multi-channel ducting by viscous fluid drag generated by an injected air, nitrogen, or other suitable gas stream. This technique is intended to apply distributed force over the entire length of the surface of the fibers, avoiding localized stresses and greatly simplifying fiber installation in pre-installed ducts.

To be suitable for blow installation, the fibers or fiber groups disclosed in the patent are provided with a loosely-fitting polymer sheath composed of polyethylene or polypropylene. The sheath may optionally be textured to increase the amount of viscous fluid drag.

Later patents describe a number of improvements in blowable optical transmission media, or in methods or equipment for media installation. Published British Patent Application 2,156,837, for example, discloses the use of adherence-reducing substances in the wall portion of conduits intended for blown fiber installation. These substances increase the length of conduit through which an optical fiber can successfully be installed.

A further coating modification, intended to improve blowability while reducing low temperature fiber buckling within the blowable sheathing, is disclosed in published European patent application EP 0157610. In that design, multiple fibers are enclosed in a dual sheath comprising an inner sheath of relatively high density and elastic modulus (e.g., polypropylene) and an outer sheath of low density and modulus. The outer sheath is formed of a cellular polymer such as foamed polyethylene. The inner, high-modulus sheath is formulated and configured to resist the longitudinal compressive stress generated by shrinkage of the outer sheath at low temperatures.

Published British patent application GB 2,206,420 describes still another design for a blowable optical fiber cable. That cable comprises multiple coated optical fibers fused into a readily separable array, generally without tight cable jacketing. The coated fibers are individually blowable and readily separated from the cable at desired branching or termination points.

The desirable blow-in characteristics of the cable and fibers are imparted by the outermost coating layer on the fibers which consists of a low-density foamed polymer such as foamed polyethylene. The low-density layer is provided as an overlayer on an underlying coating material, which is generally a conventional uv-cured acrylate protective coating. Foamed acrylates statedly comprise an alternative outer sheath material for imparting good blow-in behavior.

Published British patent application 2,206,220 discloses a design for a blowable optical fiber cable wherein multiple optical fibers (with conventional coatings) are encased together in a soft, low elastic modulus inner sheath, rather than in a high modulus sheath as in EP 0157610. The design further includes an outer sheath of a low-density foamed polymer for blowability and preferably an intermediate layer of hard high-modulus material for fiber protection.

Many of the prior art cable structures designed for blow installation are intended to be of substantial stiffness. This is because a preferred method of installation for multi-fiber cables involves initially pushing the cable into the duct, with viscous fluid drag being used as an assist to complete the installation. This technique cannot be used where single fiber installations or light flexible cable configurations are required.

A further disadvantage of some of the prior art designs involving foamed or expanded polyolefin outer coatings is that extrusion or solvent blowing methods must be used to form the foamed coatings. Extrusion techniques utilize viscous materials and require additional equipment investment, with careful process control to avoid optical attenuation in the fiber due to coating stress. Solvent blowing methods frequently require the use of expensive pollution abatement or exhaust systems in fiber manufacture.

Finally, previous blowable fiber and cable designs do not adequately protect the optical fibers from excessive signal loss at low temperatures. Foamed polymer coatings of the kinds used for blown fibers are inherently non-homogeneous, the coatings generally consisting of assemblages of gas-filled voids encased in continuous polymer matrices which are themselves not uniformly dense. Hence foamed polymer coatings, and especially thick foamed coatings, can substantially increase signal loss due to fiber microbending during fiber operation at low temperatures, i.e., in the vicinity of about $-60°$ C.

It is therefore a principal object of the present invention to provide a blowable optical fiber having excellent blow-in properties in combination with very low microbending loss at low temperatures.

It is a further object of the invention to provide single optical fibers and multi-fiber optical cables, and a coating design for the same, which are particularly suitable for blow installation.

It is a further object of the invention to provide a method for manufacturing a blowable optical fiber which utilizes liquid draw coating rather than extrusion to provide an outer coating for the fiber.

It is a further object of the invention to provide a coating process for making blowable optical fibers and coatings which does not rely on solvent blowing methods and associated pollution abatement or exhaust systems.

It is a further object of the invention to provide a method for making blowable optical fiber and cable which offers better dimensional control over the applied low-density foamed polymer coating than prior art methods.

It is a further object of the invention to provide a coating system and blowable optical fibers or cables comprising the same which offer flame retardant properties.

It is a further object of the invention to provide a coating system and blowable optical fibers or cables comprising the same which permit the convenient color coding of the fibers or cables by the inclusion of identifying colorants in the coatings.

Other objects and advantages of the invention will become apparent from the following description.

SUMMARY OF THE INVENTION

The present invention provides a blowable optical communication medium, such as a single coated optical fiber or an optical cable comprising one or multiple optical fibers, which offers improved installation and performance characteristics due to improved coating design. The medium includes a textured outer coating such as a foamed polymer coating and, positioned interiorly of the textured outer coating, at least one soft buffer layer comprising a polymer exhibiting a very low glass transition temperature (a low $T_g$ polymer). The low $T_g$ polymer layer will be of a thickness at least sufficient to prevent harmful microbending of the coated optical fiber or fibers even by extreme thermal contraction of the textured outer coating, thereby avoiding unacceptable signal loss in the fiber or cable at very low temperatures.

The low $T_g$ coating layers provided in accordance with the invention additionally have a low room temperature elastic modulus in order to provide protection from fiber damage during handling as well as low signal loss from fiber microbending at normal ambient temperatures. Silicone polymers or special low transition temperature acrylate polymers can provide the required combination of a low room temperature elastic modulus and a low glass transition temperature, and are therefore suitable for providing low $T_g$ layers in the blowable optical fibers and cables of the invention.

While other textured polymer layers such as the conventional foamed polyolefin (polyethylene or polypropylene) coatings can be used in combination with low $T_g$ layers to provide the blowable optical fibers of the invention, the preferred textured polymer outer coating on these fibers is a layer of foamed polyvinyl chloride (PVC). This foamed coating provides a textured surface as needed to provide a blowable fiber design, and is easily applied. Moreover, we have found that thick layers of this foamed polymer, considered to be essential in prior art fiber designs to insure good blow-in characteristics, are neither necessary nor desirable for successful blow installation and low temperature operation with the coating systems of the invention.

The invention further comprises a method for making a blowable optical fiber or cable, most advantageously providing the improved low temperature performance as above described, which comprises the step of applying an outer textured polymer layer comprising a foamed polyvinyl chloride coating to a precoated optical fiber or cable. For best low temperature performance, the precoated fiber or cable preferably includes at least one precoating layer of a low glass transition temperature polymer, with the textured coating being applied either directly to the layer of low transition temperature polymer or to one or more covering layers interposed between the low $T_g$ layer and the textured PVC coating to be applied.

In another preferred method in accordance with the invention, the foamed polyvinyl chloride coating is applied by a liquid coating process. A liquid polyvinyl chloride plastisol comprising a chemical foaming agent is first applied to the surface of a precoated optical fiber, optical cable, or group of fibers to form a plastisol layer. Thereafter, the liquid plastisol layer is expanded (foamed) and cured by heating to provide a foamed polyvinyl chloride outer coating on the fiber, fiber group or cable which is of a texture suitable for imparting good blow-in characteristics. The thickness of the polyvinyl chloride foam coating can be as low as 5 microns, although thicker coatings can of course be used if desired. Preferably, for good low-temperature operating characteristics, the precoated fiber, fiber group or cable to which the liquid PVC plastisol is applied will comprise at least one coating layer composed of a low $T_g$ polymer.

The blowable optical cables of the invention are of relatively simple yet effective coating design. Like the blowable fibers, they are sufficiently light and flexible to be installable in suitable ductwork by free blowing, i.e., without mechanical pushing or pulling, so that no localized stressing of the cable to force it into the ductwork is normally required.

The cables typically comprise one or multiple optical fibers plus additional strengthening or protective members or coatings, but with all fibers in the cable being protected from low temperature microbending by the presence of a low glass transition temperature polymer layer or embedment material. The latter material is provided at least between the fibers and the textured outer coating, and most preferably surrounding each of the fibers in the cable.

The textured outer coating on the cables is again most preferably a foamed polyvinyl chloride outer coating. Both bundled fiber cabling and flat or ribbon cable designs may be provided. Typically, one to eight fibers will be present in the cables for horizontal interior optical wiring applications, although for high fiber-count backbone or interbuilding links twelve to twenty or more fibers may be included.

DESCRIPTION OF THE DRAWING

The invention may be further understood by reference to the drawings wherein.

DETAILED DESCRIPTION

By a low $T_g$ polymer in accordance with the present invention is meant a polymer having a glass transition temperature not exceeding about $-50°$ C. The significance of low glass transition temperature in these coatings is as follows. Below the glass transition temperature of many common coating polymers, the negative thermal coefficient of elastic modulus of the coating material increases markedly, such that very rapid increases in coating stiffness with decreasing temperature are observed. If the glass transition temperature of the coating is selected to be appropriately low, then the harmful effect of this large coefficient change can be substantially avoided.

The present invention recognizes that soft polymer coatings of the kind most commonly used for the physical protection of optical fibers in conventional optical cables, while having low elastic moduli at room temperature and good low temperature performance in standard cable designs, do not provide adequate protection against low temperature microbending in blown fiber designs. For example, conventional soft acrylate coatings allowing good low temperature fiber performance in standard cables permit excessive microbending loss at temperatures as high as $-10°$ C. when covered with adherent textured (e.g., foamed) polymer coatings.

We attribute this effect to the fact that textured coatings such as used in blowable fibers comprise rough surfaces and are not homogeneous, thus tending to generate short range asymmetric stresses on the coated fibers at low temperatures. Separation of the foam coatings from the glass by smooth high modulus protective layers, as proposed in the prior art, can improve microbending protection but adds significantly to coating complexity and cost.

The blowable optical fibers and cables of the present invention exhibit little or no signal loss due to microbending at temperatures down to $-60°$ C. More specifically, these fibers and cables exhibit less than 0.5 db/km and preferably less than 0.3 db/km of excess signal loss due to microbending at a signal wavelength of 1300 nm when operated at temperatures over the range of about $0°$ C. to about $-60°$ C.

Figure 1:
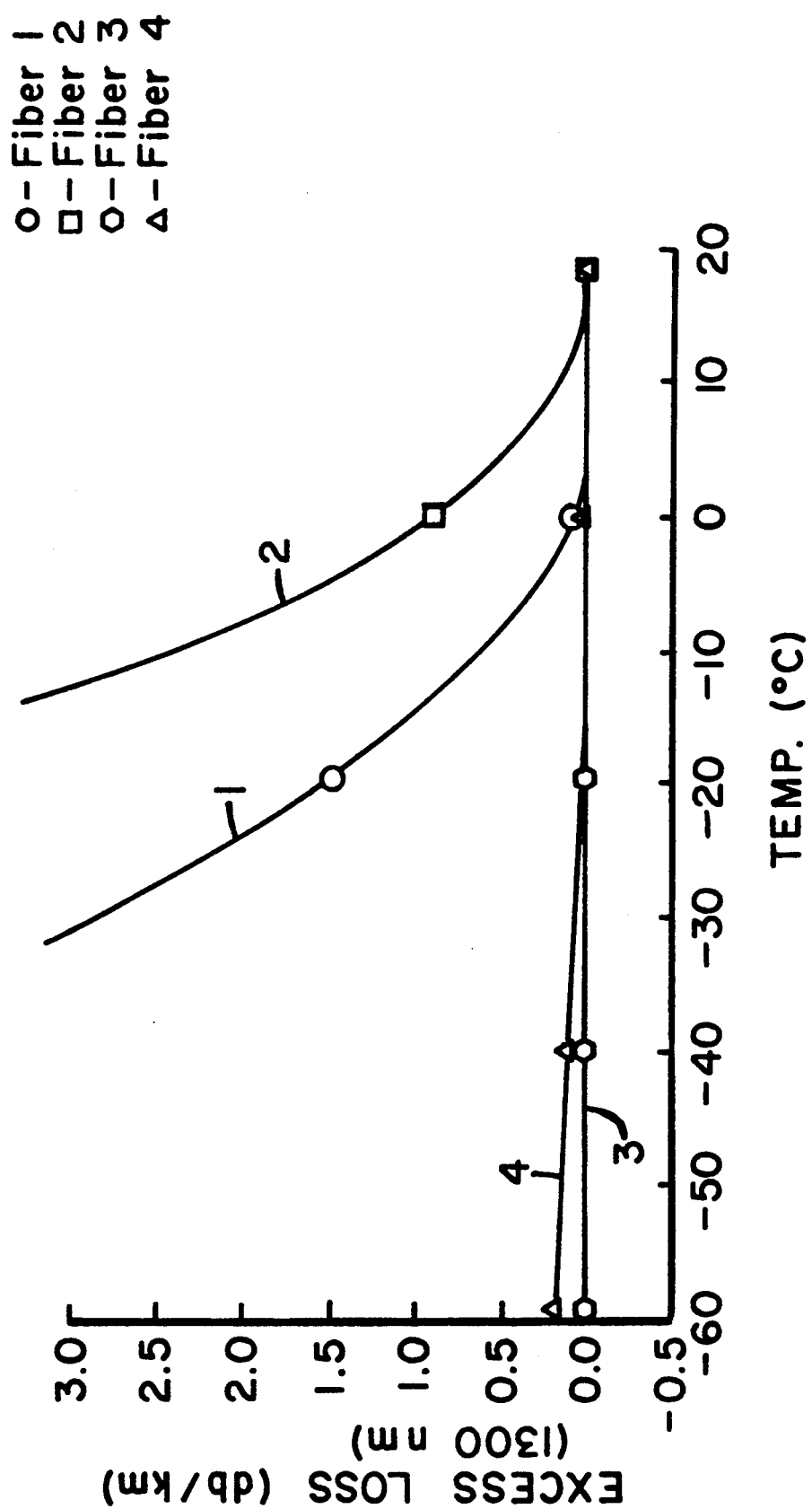
FIG. 1 plots excess optical loss versus temperature for blowable conventional optical fibers and blowable optical fibers provided with low $T_g$ buffers in accordance with the invention.

A comparison of low temperature fiber performance for blowable optical fibers comprising identical textured foam coatings but differing soft buffer configurations is provided by FIG. 1 of the drawings. As shown in FIG. 1, prior art optical fibers 1 and 2, which are 125 μm fibers of single mode and multimode design, respectively, and which comprise conventional soft acrylate buffer coatings of approximately 60 μm thickness, exhibit very rapid and severe increases in excess loss for 1300 nm signal transmission at temperatures as high as $0°$ C. when provided with 150 μm overcoatings of foamed polyvinyl chloride polymer. Thus multimode fiber 1 shows significant excess loss at $0°$ C., while single mode fiber 2 shows a similar level of loss at $-20°$ C.

This behavior is in marked contrast with that of identical single mode and multimode optical fibers provided with intermediate buffering layers of a low $T_g$ polymer, identified in FIG. 1 as fibers 3 and 4, respectively. Fibers 3 and 4 include low $T_g$ polymer overcoatings approximately 75 μm in thickness between the acrylate buffer and the 150 μm polyvinyl chloride foam overcoatings. Both fibers exhibit excess losses well below 0.3 db/km at all temperatures down to and including $-60°$ C., with single mode fiber 4 showing no significant excess loss at this temperature.

Low elastic modulus coating materials having the requisite low $T_g$ required for good low temperature operation are commercially available. Examples of suitable coating materials are low $T_g$ acrylate coatings, low $T_g$ uv-curable silicone coatings, and low $T_g$ thermally curable silicone coatings. The silicone coatings are particularly preferred from the standpoints of low glass transition temperature, low elastic modulus, and good flame retardant characteristics. Also these coatings can be rapidly and conveniently liquid-applied to optical fibers as the fibers are manufactured, and they can be efficiently cured on the draw even at very high drawing and coating speeds.

The thickness of the low $T_g$ elastomer or other polymer buffer coatings provided on optical fibers or in optical cables in accordance with the invention will be at least sufficient to protect the fibers alone or in cabled form from low-temperature microbending losses generated by pressure from the exteriorly applied textured coatings. In general, low $T_g$ layer thicknesses of 50 μm or more on each fiber, or at least between each fiber and the textured exterior polymer coating subsequently applied to the fiber or cable, are found to be satisfactory for this purpose.

As previously noted, the location of the low $T_g$ polymer layer within the multilayer optical fiber or cable coating is not critical since the primary function of the layer is to insulate the fiber(s) from the textured exterior coating. Thus, in a single optical fiber, the layer may be disposed directly on the fiber or instead over one or more primary buffer layers composed of other inorganic or organic coating materials previously applied to the fiber. Similarly, in an optical cable, the fiber or fibers may be provided with individual low $T_g$ polymer layers or encased in a low $T_g$ polymer matrix, with strengthening or other cabling elements positioned exteriorly of the layer and beneath the textured outer coating, or the low $T_g$ layer may be positioned immediately beneath the textured exterior coating.

By a textured exterior coating in accordance with the present description is meant an outer coating having a level of surface roughness sufficient for blow-in installation of the fiber or cable. For the coating designs of the invention, a surface roughness of at least about 1 micron provides a satisfactorily textured coating, although much higher roughness levels are useful and are normally preferred.

The particularly preferred textured outer coating of the blowable optical fiber or cable of the invention is a foamed polyvinyl chloride coating. Foamed polyvinyl chloride formulations are well known, being currently marketed as flexible or rigid foamed materials of open-celled or closed-cell structure. These foams are widely used for a variety of applications including clothing, synthetic leather, upholstery, construction materials, and the like.

Polyvinyl chloride foams are generally made from polyvinyl chloride plastisols, the principal constituents of which are a liquid plasticizer medium in which a finely divided normally solid polyvinyl chloride resin is dispersed. Additional components of such plastisols may include stabilizers, fillers, pigments and surfactants.

Polyvinyl chloride plastisols may be foamed by mechanical means or by the inclusion of chemical foaming or so-called blowing agents therein, foaming being accomplished more or less contemporaneously with the curing process. The curing or conversion of the wet plastisols to solid thermoplastics is accomplished by heating to cause gelation and fusion of the plastisol. Heating causes the polyvinyl chloride resin particles in the sol to absorb plasticizer and swell, the swollen resin particles ultimately coalescing into a gel which is then fused and cooled to provide a durable thermoplastic material. If appropriate chemical foaming agents are added to the plastisol, the release of gas during the curing process produces a foamed rather than a dense thermoplastic product.

For a further description of the formulation and processing of polyvinyl chloride foams, reference may be made to the numerous literature sources available including, for example, Calvin J. Benning, *PLASTIC FOAMS: The Physics and Chemistry of Product Performance and Process Technology*, Volume 1, Chapter 4, "Principles of Foam Formation: Polyvinyl Chloride Foams," pages 345-419, Wiley-Interscience, New York (1969).

Polyvinyl chloride plastisols suitable for the preparation of foamed coatings on optical fibers in accordance with the invention can be formulated from any of the commercially available plastisol preparations, or from plastisols made for the purpose by compounding together commercial PVC resins and plasticizers. Plasticizers used in the commercial formulations, and also suitable for the custom formulation of PVC plastisols, include plasticizers such as the adipates, azelates, benzoates, chlorinated hydrocarbons, epoxy compounds, pthalates, isophthalates, terepthalates, phosphates, polyesters, and mixtures thereof.

Chemical foaming agents to be mixed with the selected PVC plastisol formulation prior to coating application and curing in order to achieve the desired level of expansion of the coating are also readily commercially available. Examples of foaming agents particularly suitable for the expansion of PVC plastisols include the carbonates, azodicarbonamide, azobisisobutylronitrile and related compounds. The amount of foaming agent included in any particular formulation to achieve a selected level of expansion depends on the composition of the plastisol and foaming agent selected, but can readily be determined in each instance by routine experiment.

As will readily be appreciated, the addition of colorants to these plastisol formulations provides a convenient method for imparting permanent coloration to the textured outer coatings, as a color coding or fiber identification means. This is of particular advantage for applications wherein multiple fibers are provided in a single conduit or cable assembly.

As an illustration of a simple procedure for providing a blowable optical fiber from these materials, a commercially available liquid PVC plastisol, purchased as RDP-1267 plastisol from the Plastisols Division of the Dexter Corporation, Charlotte, N.C., is selected and a commercially available chemical blowing agent is added as a liquid to the plastisol in a concentration of about 1% by weight, with thorough blending to obtain a homogeneous mixture. The blowing agent selected is purchased as Celogen OT blowing agent from the Uniroyal Chemical Company, Inc. of Naugatuck, Conn.

To apply the foam coating, a length of commercially available optical fiber comprising a soft protective acrylate coating is drawn through an open cup applicator comprising the plastisol mixture. The plastisol-coated fiber is then immediately drawn through an oven operating at a temperature of about 450° C. wherein expansion and curing of the coating occurs within a few seconds. The coated fiber thus provided has an exterior textured foam PVC coating which is durable, adherent, light in weight, and of a surface texture well suited for blow-in installation of the fiber.

The invention is particularly well suited for the continuous high speed manufacture of single blowable optical fibers from standard commercially available coated optical fibers by an overcoating process. This process can both adapt the single fibers for blow-in installation and provide buffer protection permitting dependable operation of the fiber over a wide temperature range. The overcoated single fibers are easily installable alone or in groups into blown fiber ductwork, utilizing conventional fiber blowing procedures and equipment. The following example illustrates an embodiment of the invention which achieves these results.

EXAMPLE 1

A commercially available coated glass optical fiber comprising a glass core and cladding and a protective uv-cured acrylate coating covering the glass fiber is first selected for processing. The fiber is commercially available as Corguide ® Code 1521 optical fiber from Corning Incorporated of Corning, N.Y. The glass core and cladding portion of the fiber have a diameter of 125 $\mu$m, with the protectively coated fiber having an overall diameter of about 250 $\mu$m.

A silicone polymer is next selected to provide a low $T_g$ buffer layer on the coated fiber. The silicone selected for this overcoating or so-called upjacketing process is a thermally curable two-package silicone elastomer consisting of a silica-hydride-cured alkene, commercially available as Sylgard TM 184 silicone elastomer system from the Dow Corning Corporation of Midland, Mich. This elastomer has a glass-transition temperature of approximately −50° C.

To provide a coating of the silicone elastomer on the fiber, the fiber is positioned on a tensioned payout and the fiber under tension is passed through a drying furnace. Adsorbed water and other low molecular weight volatile materials are driven from the protective acrylate coating by this treatment prior to the application of the silicone coating layer thereover.

Application of the silicone layer is then accomplished utilizing the known continuous coating process and apparatus described in U.S. Pat. No. 4,848,869. The coating, consisting of a liquid mixture of the Part A and Part B packages of the elastomer system, is applied directly from a liquid coating die to the fiber at a liquid temperature of 15° C. as the fiber is continuously drawn from the oven through the die. The coating die is a pressure coating die of the type disclosed in U.S. Pat. No. 4,531,959. The die orifice and pressure of the liquid coating in the die are adjusted to provide a liquid coating approximately 75 μm in thickness on the surface of the coated fiber, such that the diameter of the silicone-overcoated fiber is approximately 400 μm.

Following this application step, the applied liquid coating is converted to a silicone elastomer coating by drawing the liquid-coated fiber through a curing furnace to achieve cure. The curing furnace is maintained at a temperature of approximately 580° C., and is flushed with helium during curing to improve heat transfer to the coating. These conditions are effective to assure complete cure of the silicone coating layer at the point of exit of the fiber from the furnace.

The elastomer-coated fiber thus provided is next overcoated with an expanded foam polyvinyl chloride polymer coating to furnish a textured surface thereon. The polymer coating is provided by the application to the fiber of a commercial foamable polyvinyl chloride plastisol formulation, purchased as Dexter RDP 1519-4 PVC plastisol from the Plastisols Division of the Dexter Corporation, Charlotte, N.C. This plastisol is formulated to contain about 2% by weight of a commercial foaming agent in its composition, that agent being identified as Celogen OT blow agent purchased from the Uniroyal Chemical Company, Inc., of Naugatuck, Conn.

To apply the foam coating, the commercial plastisol is continuously applied as a liquid overcoating to the fiber, utilizing the same procedure and apparatus as used to apply the silicone coating above, except that the two-package handling elements of the apparatus are not needed. The premixed plastisol is applied to the surface of the silicone elastomer overcoating layer as the overcoated fiber exits the curing furnace for the previously applied silicone coating. The plastisol is applied at a temperature of 15° C., and at a pressure sufficient to provide a liquid plastisol coating approximately 50 microns in thickness on the surface of the coated fiber.

Following the application of the liquid plastisol coating layer over the silicone coating on the fiber, the liquid-coated fiber is drawn through a second curing furnace to achieve cure and expansion (foaming) of the polyvinyl chloride coating. The curing furnace is maintained at a temperature of approximately 510° C., and is again flushed with helium gas for added heat transfer to the coating. These conditions are effective to provide complete curing and expansion of the polyvinyl chloride layer prior to the time the coated fiber exits the curing furnace. As a result of the expansion process during curing, the nominal diameter of the overcoated blowable fiber thus provided is approximately 700 microns.

The temperature of the polyvinyl chloride foam outer coating at the conclusion of the curing step is sufficiently high that the coating is soft and subject to surface damage on contact with other fibers or fiber collection and storage media. Accordingly, after the coated fiber exits the curing furnace but before contact with the fiber drawing tractors and collection reel, it is first cooled to rigidify the coating by passage through a fine water spray. An alternative and more efficient cooling method would be to use a conventional optical fiber cooling tube.

The blowable optical fiber produced as described exhibits good blow-in characteristics and excellent low temperature optical performance. Friction test data obtained by the measurement of drag forces between similarly coated fibers and standard fiber duct materials indicate that such fibers are blow-installable over duct installation distances in excess of 500 meters, even at compressed gas pressures below 100 psig. Actual blow installation tests with fibers of this type confirm this desirable installation behavior.

The low temperature loss characteristics of fibers comprising the coating system of Example 1 are found to be markedly superior to conventionally coated blowable fibers. As previously noted, FIG. 1 of the drawing is a plot of excess signal loss (due to fiber microbending) versus temperature for various optical fibers. The loss characteristics shown in FIG. 1 for Fibers 3 and 4, which were coated in accordance with Example 1 above, are presently considered to be typical of the loss characteristics attainable in accordance with the invention. The performance advantage over prior art fibers 1 and 2 of FIG. 1 is readily apparent.

A blowable optical fiber communication medium consisting of a lightweight optical cable (mini-cable), which cable includes multiple optical fibers in a multi-layer polymer coating adapted for blow installation, can be made by a procedure similar to that disclosed in Example 1 above. An illustration of a suitable procedure for fabricating such a cable is provided by the following Example.

EXAMPLE 2

Four commercial acrylate-coated optical fibers having the same construction as the acrylate-coated fiber processed in Example 1 are selected for cabling. These fibers are mounted on separate tensioned payouts, and the fiber ends are collected and collimated in a four orifice guide die in preparation for coating.

The collimated fibers in a square array (approximately 0.8×0.8 mm) are drawn through a drying furnace as in Example 1. This drying effects the removal of volatile materials from the acrylate coatings on the fibers prior to the application of silicone elastomer overcoatings thereto.

To apply a silicone elastomer coating to the fiber array, the array is next passed through a pressure coating die similar to that utilized in Example 1, except that the inlet and outlet orifices are enlarged to accept multiple fibers. The commercial two-package silicone elastomer used in Example 1 is again applied, with the same elastomer coating and curing conditions being maintained.

The product of the elastomer coating process is a silicone-embedded fiber array of generally circular cross-section having a diameter of approximately 1 mm. The coated array is substantially free of internal and external coating voids and discontinuities, and the thickness of the elastomer layer provided exteriorly of the fibers in the array is in excess of about 50 μm.

Following the application of the silicone elastomer embedment to the array, an overcoating of foamed PVC polymer is applied over the silicone elastomer, following the plastisol overcoating procedure substantially as described in Example 1. The same commercial PVC plastisol formulation is used, and is liquid applied to a thickness of approximately 50 μm. The plastisol layer is then foamed and cured by passage through a curing furnace as in Example 1, with the coated array thereafter being cooled, collected, and examined.

The product of the above-described procedure is a flexible optical mini-cable comprising four elastomer-buffered optical fibers and having an outer diameter, with foamed PVC coating, of approximately 1.2 mm.

The cable exhibits excellent blow-in and low temperature optical performance.

Figure 2:
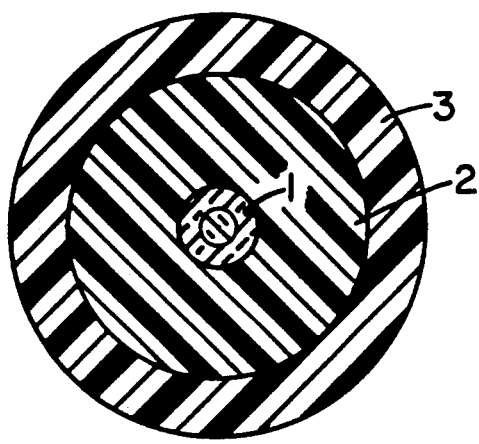
FIG. 2 is a schematic illustration in cross-section of a blowable optical fiber provided in accordance with the invention.
Figure 3:
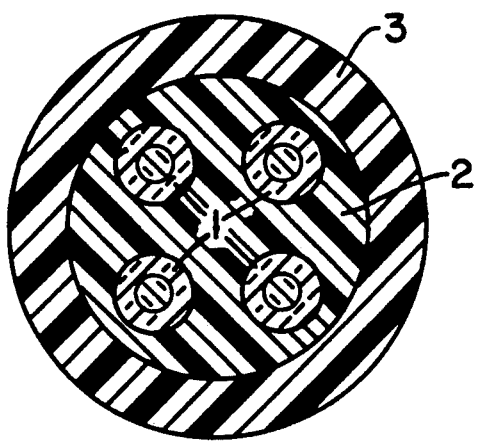
FIG. 3 is a schematic cross-sectional illustration of a four-fiber optical bundle cable suitable for free-blowing installation in accordance with the invention.

Blowable optical fiber and optical cable designs which may be made in general accordance with Examples 1 and 2 above are schematically illustrated in FIGS. 2 and 3 of the drawing. FIG. 2 illustrates a blowable optical fiber similar in configuration to that of Example 1, incorporating a glass optical fiber 1 which has been provided with a covering buffer layer of a low $T_g$ polymer 2. Positioned over polymer layer 2 is exterior coating 3 which is a textured coating composed, for example, of a PVC foam. As is evident from a study of FIG. 2, however, the optical fiber comprising the low $T_g$ coating in accordance with the invention need not include a protective acrylate or other organic coating between the glass optical fiber and the low $T_g$ coating, as illustrated in Example 1. Thus the low $T_g$ coating itself can readily perform both protective and low temperature buffering functions, if desired.

Similarly, FIG. 3 illustrates a design for a four-fiber blowable mini-cable similar to that described in Example 2, again comprising optical fibers 1 encapsulated in a low $T_g$ polymer matrix 2 such as a silicone elastomer, and covered by a textured outer coating 3 such as a PVC foam coating. As in the blowable fiber of FIG. 2, a protective primary fiber coating such as the acrylate coating of the fibers of Example 2 is not required since the same function can be served by the silicone elastomer coating.

Cable designs of this type may comprise from 1 to about 8 optical fibers, and are characterized in that the fibers are typically disposed in a fiber-parallel, bundled array. The soft buffer layer of low $T_g$ polymer can be an overcoating on the bundle but is most preferably provided, as in FIG. 3, as a polymer matrix encasing and supporting the glass optical fibers in a spaced bundled configuration.

The invention is also applicable to the design and production of other blowable optical cable configurations. For example, the procedure of Example 2 can readily be adapted to the production of an optical communication medium consisting of a blowable optical fiber ribbon cable. An illustration of a suitable process for blowable ribbon cable manufacture is more fully illustrated by the following example.

EXAMPLE 3

An optical fiber ribbon cable of conventional design, comprising a single one-dimensional or flat array of four optical fibers contained in a protective soft acrylate organic coating, may be selected for processing. A number of designs for these ribbon cables are known in the art, wherein the ribbon is provided simply by a fusing or bonding together of the coatings of individually coated fibers to form a flat multi-fiber bonded assembly.

Alternatively, a flat array of four uncoated fibers may be configured and formed into coated ribbon by the application of an envelope of a low $T_g$ polymer to the array. The envelope provides a matrix which can serve both as a physical protective layer for the optical fibers and as a low $T_g$ buffer to provide the required low temperature optical performance.

If the ribbon cable, or group of ribbon cables, to be formed into a blowable ribbon cable includes only conventional soft acrylate or other primary layers, an overcoating of low $T_g$ polymer is provided thereon following the procedure of Example 2. Whether for the purpose of overcoating or to provide the coating matrix for the ribbon, the two-package silicone elastomer of Example 1 provides a suitable polymer for forming the requisite low $T_g$ layer on the ribbon(s).

The resulting ribbon or ribbon group is next provided with a coating or jacketing layer of textured polymer, such as a foamed PVC polymer, covering the elastomer. Application of this coating is preferably by means of a liquid PVC plastisol which is applied to the coated ribbon or ribbon group to form a liquid coating. The liquid coating is then heat-cured and expanded to provide a suitably textured foam coating. The commercial plastisol coating utilized to provide the blowable optical fiber of Example 1 is particularly useful for this purpose.

As an alternative outer coating approach, a textured foamed PVC coating or jacket may be applied to the precoated ribbon or ribbon assembly by extrusion jacketing. In that case the foamed textured jacket may comprise a loose-fitting foamed polymer tube or a tight-fitting or adherent coating, as desired.

Figure 4:
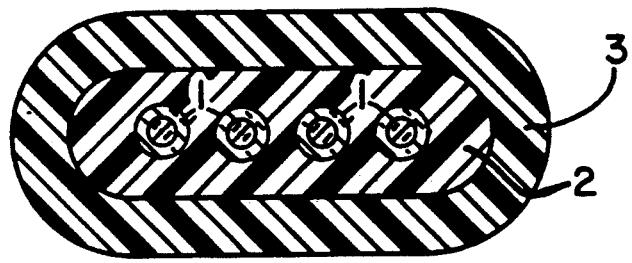
FIG. 4 is a schematic cross-sectional illustration of a four-fiber optical ribbon cable suitable for free-blowing installation in accordance with the invention.
Figure 5:
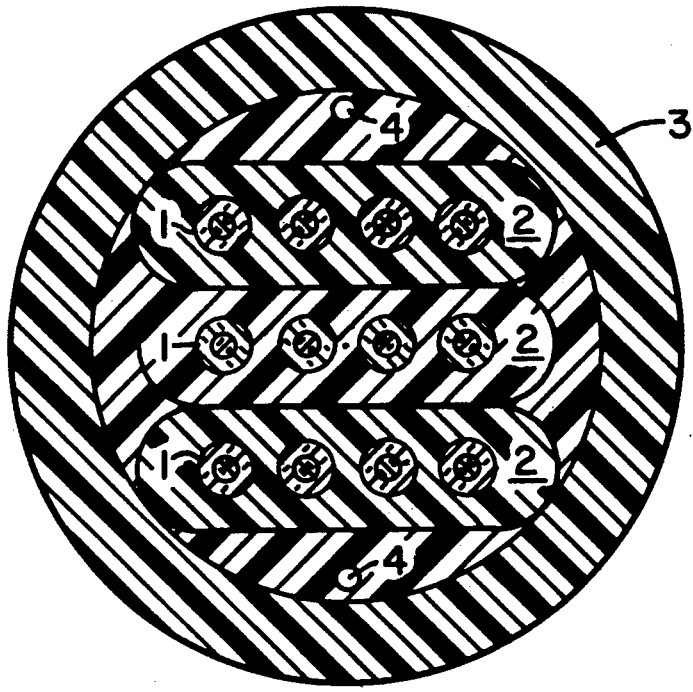
FIG. 5 is a schematic cross-sectional illustration of a twelve-fiber optical cable assembled from ribbon sub-cable components and suitable for free-blowing installation in accordance with the invention.

Examples of optical ribbon cables which may be produced in accordance with the above-described procedure are illustrated in FIGS. 4 and 5 of the drawing. In each of those figures, which are not in true proportion or to scale, one or more 4-fiber arrays 1 are provided with a low $T_g$ silicone elastomer buffer material 2 providing both a protective layer on the fibers and a coating matrix providing a ribbon structure for the fiber array. The ribbon or ribbons are then covered with a foamed PVC outer coating 3 having low density and an appropriate textured surface. The cable of FIG. 5 comprises multiple fiber ribbons and is additionally provided with a pair of lightweight synthetic fiber ripcords 4 to facilitate cable stripping and ribbon separation.

FIGS. 4 and 5 are illustrative of the preferred ribbon cables of the invention which characteristically comprise, as a core element of each cable, at least one optical fiber ribbon including multiple optical fibers disposed in a flat, fiber-parallel array, with the low $T_g$ polymer providing both a buffer and a matrix around the fibers. The matrix encase and supports the fiber array in a flat ribbon configuration, while at the same time providing an interposing buffer layer between each of the fibers and the textured polymer outer layer on the cables. Optical bundle or ribbon cables of these designs, produced in accordance with the procedure of the above described examples, are light in weight and exhibit good blow-in characteristics in combination with excellent resistance to low temperature microbending losses.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. An optical communication medium comprising one or more optical fibers in a multilayer polymer coating, wherein the multilayer coating includes a textured polymer outer layer and at least one soft buffer layer positioned between the textured polymer outer layer and the glass optical fiber, and wherein:

the buffer layer comprises a low $T_g$ polymer having a glass transition temperature not exceeding about $-50°$ C.; and the buffer layer has a layer thickness at least sufficient to maintain thermally induced microbending loss in the communication medium below about 0.05 db/km at operating temperatures in the range of 0° C. to −60° C.

2. A blowable optical fiber comprising a singles optical fiber in a multilayer polymer coating, wherein the multilayer coating includes a textured polymer outer layer and at least one soft buffer layer positioned between the textured polymer outer layer and the glass optical fiber, and wherein:

the buffer layer comprises a low $T_g$ polymer having a glass transition temperature not exceeding about −50 C.; and the buffer layer has a layer thickness at least sufficient to maintain thermally induced microbending loss in the communication medium below about 0.05 db/km at operating temperatures in the range of 0° C. to −60° C.

3. A coated optical fiber in accordance with claim 2 wherein the textured outer coating layer is disposed directly on the low $T_g$ polymer buffer layer.

4. A coated optical fiber in accordance with claim 3 wherein the multilayer coating consists essentially of the textured polymer outer layer and the low $T_g$ polymer buffer layer.

5. A coated optical fiber in accordance with claim 3 wherein the low $T_g$ polymer is selected from the group consisting of silicone elastomers and low glass transition temperature acrylate polymers.

6. A coated optical fiber in accordance with claim 3 wherein the low $T_g$ polymer is a silicone elastomer.

7. A coated optical fiber in accordance with claim 2 wherein the textured polymer outer layer is a foamed polyvinyl chloride layer.

8. A coated optical fiber in accordance with claim 7 wherein the foamed polyvinyl chloride layer is a flame retardant layer.

9. A coated optical fiber in accordance with claim 7 wherein the foamed polyvinyl chloride layer comprises a colorant.

10. An optical cable comprising one or more glass optical fibers disposed together in a multilayer polymer coating, wherein the multilayer coating includes a textured polymer outer layer and at least one soft buffer layer positioned between the textured polymer outer layer and the glass optical fibers, and wherein:

the buffer layer comprises a low $T_g$ polymer having a glass transition temperature not exceeding about −50° C.; and the buffer layer has a layer thickness at least sufficient to maintain thermally induced microbending loss in the communication medium below about 0.05 db/km at operating temperatures in the range of 0° C. to −60° C.

11. An optical cable in accordance with claim 10 which comprises, as the core element of in the cable, up to 8 glass optical fibers disposed in fiber-parallel bundled array, and wherein the soft buffer layer is provided by a low $T_g$ polymer matrix encasing the glass optical fibers and interposed between each of the fibers and the textured polymer outer layer.

12. An optical cable in accordance with claim 10 which comprises, as a core element in the cable, at least one optical fiber ribbon comprising multiple optical fibers disposed in a flat, fiber-parallel array, wherein the soft buffer layer is provided by a low $T_g$ polymer matrix encasing and supporting the fiber array in a flat ribbon configuration, and wherein the low $T_g$ matrix is interposed between each of the fibers and the textured polymer outer layer.

13. An optical cable in accordance with claim 10 having a flat ribbon configuration wherein a single optical fiber ribbon comprises the core element of the cable and wherein the textured polymer outer layer of the cable is provided by an adherent coating of a foamed polyvinyl chloride polymer.

14. A blowable optical communication medium comprising a single optical fiber in a multilayer polymer coating, wherein:

the multilayer coating includes at least one primary acrylate coating;

the multilayer coating includes a textured polymer outer layer and at least one soft buffer layer positioned interiorly of the textured polymer outer layer;

the soft buffer layer comprises a low $T_g$ polymer having a glass transition temperature not exceeding about −50° C.; and the buffer layer has a thickness at least sufficient to maintain thermally induced microbending loss in the fiber below about 0.5 db/km at communication medium operating temperatures in the range of 0° C. to −60° C.

15. An optical cable comprising one or more glass optical fibers disposed together in a multilayer polymer coating, wherein the multilayer coating includes a textured polymer outer layer and at least one soft buffer layer positioned between the textured polymer outer layer and the glass optical fibers, and wherein:

the buffer layer comprises a low $T_g$ polymer having a glass transition temperature not exceeding about −50° C.;

the buffer layer has a layer thickness, as measured between each fiber and the textured polymer outer layer, which is at least sufficient to maintain thermally induced micro-bending loss in the fibers in the cable below about 0.5 db/km at cable operating temperatures in the range of 0° C. to −60° C.; and the textured polymer outer layer is a layer of foamed polyvinyl chloride.

* * * * *